US007698456B2

(12) United States Patent
Guichard et al.

(10) Patent No.: US 7,698,456 B2
(45) Date of Patent: Apr. 13, 2010

(54) METHODS AND APPARATUS TO SUPPORT ROUTING OF INFORMATION (75) Inventors: James N. Guichard, Groton, MA (US); Robert Hanzl, Nashua, NH (US); Henk Smit, Gouderak (NL)

(73) Assignee: Cisco Technology, Inc., San Jose, CA (US)

( * ) Notice: Subject to any disclaimer, the term of this patent is extended or adjusted under 35 U.S.C. 154(b) by 1441 days.

(21) Appl. No.: 10/674,079

(22) Filed: Sep. 29, 2003

(65) Prior Publication Data
US 2005/0083955 A1    Apr. 21, 2005

(51) Int. Cl.
G06F 15/173    (2006.01)
(52) U.S. Cl. ...................................... 709/238
(58) Field of Classification Search .............. 709/238, 709/243
See application file for complete search history.

(56) References Cited

U.S. PATENT DOCUMENTS

| | | | |
|---|---|---|---|
| 6,009,081 A | 12/1999 | Wheeler et al. ............ 370/255 |
| 6,081,508 A | 6/2000 | West et al. ................. 370/238 |
| 6,526,056 B1 | 2/2003 | Rekhter et al. ............. 370/392 |
| 6,574,224 B1 | 6/2003 | Brueckheimer et al. | 370/395.36 |
| 6,640,239 B1 | 10/2003 | Gidwani ..................... 709/203 |
| 6,680,940 B1 | 1/2004 | Lewin et al. ............... 370/389 |
| 6,680,943 B1 | 1/2004 | Gibson et al. ............. 370/392 |
| 6,683,865 B1 | 1/2004 | Garcia-Luna-Aceves et al. ......................... 370/349 |
| 6,697,329 B1 | 2/2004 | McAllister et al. .......... 370/235 |
| 6,724,881 B1 | 4/2004 | McAllister et al. ..... 379/220.01 |
| 7,020,085 B2 * | 3/2006 | Mimura et al. ............. 370/235 |
| 7,116,665 B2 * | 10/2006 | Balay et al. ................. 370/392 |
| 7,152,115 B2 * | 12/2006 | Ould Brahim et al. ...... 709/238 |
| 7,283,529 B2 * | 10/2007 | Basso et al. ................. 370/392 |
| 7,313,605 B2 * | 12/2007 | Iloglu et al. ................. 709/219 |
| 7,340,535 B1 * | 3/2008 | Alam ......................... 709/246 |

(Continued)

FOREIGN PATENT DOCUMENTS

WO    WO 03/073707 A1    9/2003

OTHER PUBLICATIONS

Gleeson B. et al.: "A Framework for IP Based Virtual Private Networks" Request for Comments 2764—Network Working Group, Feb. 2000, pp. 1-63, XP015008547, http://www.sanface.com/txt2pdf.html.

(Continued)

*Primary Examiner*—Douglas B Blair
(74) *Attorney, Agent, or Firm*—Brinks Hofer Gilson and Lione (57) ABSTRACT A first network node maintains separate routing policy information to forward network traffic depending on a direction of the network traffic. Upstream routing policy information at the first node identifies a second node to forward upstream traffic received from at least a first client communicating through the first node. Downstream routing policy information at the first node identifies how to forward downstream network traffic received from another node to the first client. By preventing use of the downstream policy routing information by the first client to route upstream network traffic, the first node is able to forward traffic along a path that the network traffic otherwise would have not traveled. For example, network traffic communicated through the first node can be forced to travel through another network node through which it would have not otherwise have passed if the downstream policy information was available to route the network traffic.

26 Claims, 7 Drawing Sheets

U.S. PATENT DOCUMENTS

| | | | |
|---|---|---|---|
| 7,486,659 B1 * | 2/2009 | Unbehagen et al. | 370/351 |
| 7,499,419 B2 * | 3/2009 | Balay et al. | 370/312 |
| 7,584,298 B2 * | 9/2009 | Klinker et al. | 709/238 |
| 2004/0141462 A1 * | 7/2004 | Mistry et al. | 370/229 |
| 2007/0271605 A1 * | 11/2007 | Le Pennec et al. | 726/13 |

OTHER PUBLICATIONS

Rosen E Rekhter Y: "BGP/MPLS VPNs" Mar. 1999, Network Working Group Request for Comments 2547, pp. 1-24, XP-002959287, http://www.ietf.org/rfc/rfc2547.txt?number=2547.

Canadian Office Action dated Jun. 18, 2008, for Application No. 2,534,637 (2 pgs.).

Canadian Office Action dated Apr. 16, 2009, for Application No. 2,534,637 (2 pgs.).

European Office Action dated Aug. 30, 2006, for Application No. 04 785 209.0-2416 (2 pgs.).

European Office Action dated Sep. 19, 2007, for Application No. 04 785 209.0-2416 (7 pgs.).

Translation of Chinese Office Action dated Nov. 9, 2007, for Application No. 200480020340.5 (9 pgs.).

* cited by examiner

METHODS AND APPARATUS TO SUPPORT ROUTING OF INFORMATION

BACKGROUND

Computer networks known as "subscriber networks" offer high speed long-haul transport of data communications between remote installations of subscriber or customer network facilities. As an example, a bank with several branches, or a large chain restaurant or other customer with several remote or geographically distributed installations that each operate a computer network (e.g., local area network installations) may subscribe to a subscriber or carrier network to provide data communications capabilities between that customer's remote network installations. Subscriber networks are able to transport many different types of data on behalf of many different customers of the subscriber network. One technology that supports this capability of a subscriber network to transport different types of data on behalf of different customers is called Multi-Label Protocol Switching (MPLS). MPLS is a technology known to those skilled in the art and is documented in several Request For Comments (RFCs) published by a standards organization called the Internet Engineering Task Force (IETF).

Subscriber networks supporting MPLS typically include a number of edge routers (Provider Edge or PE routers) to which customer edge routers (CE routers on the edge of each customer facility) connect with in order to communicate over the subscriber network. MPLS-based subscriber networks may provide wholesale services in which subscribers access various services of the network based on use of certain layer-2 service selection criteria. Layer-2 service selection requires the use of a PPP (Point-to-Point) client such as PPPoE (Point-to-Point Protocol over Ethernet) or PPPoA (Point-to-Point Protocol over ATM). Generally, to initiate a PPP session with a wholesale Service Provider (who may own the service supporting the subscriber), the client selects a given service and enters a username@servicename and password.

One type of wholesale service supported by an MPLS network may be "hub & spoke" Internet type access between a client (e.g., spoke) and an upstream ISP (Internet Service Provider) (e.g., a hub). According to this topology, multiple Internet subscribers may be provided with Internet access and connectivity with other subscribers through the MPLS core to the hub ISP. The upstream ISP typically includes a node that assigns public IP (Internet Protocol) addresses from a given subnet to subscribers initiating session requests to communicate over the Internet. In this case, such clients may be, for example, dial-in users such as employees that require access to an employer's facility.

To establish a session for such a service, a subscriber may initiate a PPP session based on a given username@servicename such as subscriberA@ISP-A.com. An LAC/PE-router receives and sends the username@servicename and password information to a wholesale Service Provider RADIUS server (i.e., a Remote Authentication Dial-In User Server). At the Service Provider RADIUS server, the "servicename" is used to index into a profile that contains information on the IP address of the RADIUS server for the "servicename" Service Provider (for example ISP-A.com). The username@servicename and password is then forwarded from the Service Provider RADIUS server (which acts as a "proxy-radius") to an ISP RADIUS server. The ISP RADIUS server authenticates the received information and assigns and returns an IP address for use by the requesting subscriber.

After authentication, a so-called "Access-Accept" is then sent back from the ISP RADIUS server to the wholesale Service Provider RADIUS server. The wholesale Service Provider RADIUS server adds authorization information to the Access-Accept packet (based on the servicename or domain-name) and forwards the Access-Accept packet back to the LAC/PE-router, where a temporary Virtual-Access interface (with associated /32 IP address) for the user is placed into an appropriate VRF (Virtual Routing & Forwarding Instance) for routing purposes.

SUMMARY

Unfortunately, there are deficiencies associated with conventional methods of utilizing and maintaining VRF information at a PE network node to route data packets based on the hub & spoke topology discussed above. Consider a hub and spoke topology in which multiple subscribers establish network sessions through a common PE (Provider Edge) node (e.g., edge router) of a core subscriber network supporting MPLS. According to conventional methods, VRF information at the PE node is available so that traffic received from a first client coupled to communicate through the PE node may be forwarded directly back to a second client also coupled to communicate through the PE node without passing through an upstream ISP or a wholesale service provider network.

Deficiencies exist in conventional designs of processing VRF information at provider edge node as explained above. For example, clients (e.g., subscribers that have established a network session) associated with a common service connected to the same wholesale Service Provider PE-router may transmit packets directly to each other through the PE-router (e.g., via the use of VRF information at the PE-router) without having to send packets to an upstream ISP (Internet Service Provider) node. More specifically, a first client may transmit a network message to the PE-router. The network message may have a destination address of a second client also coupled to communicate through the same PE-router. To forward the network message, the conventional PE-router may use its VRF information to forward the network message directly back to a second client coupled to the PE node because the routing policy information in the PE-router is available for routing data packets directly back to any of its multiple supported clients. Thus according to conventional techniques, traffic between subscribers is able to be locally switched at the PE-routers due to the fact that the /32 IP address of each subscriber virtual-access interface is available within the VRF of that service.

This occurrence in conventional mechanisms and techniques for processing VRF information is undesirable for a number of reasons. For example, traffic between two such subscribers may not traverse a central link between a Service Provider Wholesale network and an ISP domain. This is undesirable because, in many cases, the ISP has to pay the Wholesale Service Provider for the amount of data transported on the central link. Instead, the ISP would prefer to handle (or at least be able to monitor) traffic transmitted by its subscribers.

Additionally, certain regulations require that IP traffic between subscribers must be able to be monitored or intercepted at an accessible network node. As an example, a banking institution may require that each communication from a client (e.g., a dial in customer of the bank) pass through a central monitoring and logging facility located at a specific bank facility on the subscriber network. However, the bank branch that the customer desires to connect with may happen to be locally coupled to the same provider edge node that the customer connects into. As such, since the VRF information in this conventional provider edge node example combines or commingles the routing information for both the customer and the bank branch that the customer desires a connection with in the same VRF routing information table, the provider edge router may route the outbound or upstream customer connection directly through itself to the bank branch desired as a downstream connection, while bypassing the bank institutions monitoring facility entirely. Most wholesale Service Providers (such as the network supported by MPLS as discussed above) prefer that any monitoring be done at the ISP network. Consequently, any subscriber-to-subscriber traffic would preferably travel through a node (e.g., a hub node) of the ISP network for monitoring. If this could be achieved, the wholesale service provider would provide a 'true' transport service.

It is an advancement in the art to maintain separate routing policy information entries to forward network traffic through a network node depending on a direction of the network traffic. For example, note that the provider edge node in the above example enables network traffic transmitted by a first client to be forwarded directly to a second client without passing through other nodes (or a specific node) in the network. Consequently, it may not be possible to monitor the network traffic through the provider edge node because of the limited path along which the network traffic flows. In contradistinction to this conventional technique, maintaining separate routing policy information (e.g., half duplex VRF information) according to the present invention for different directional traffic ensures that such traffic can be forwarded through a specified node and eventually to a target even though the network traffic may have otherwise traversed a shorter, more direct path to reach the target according to conventional methods.

Accordingly, one embodiment of the invention involves maintaining separate upstream routing policy information and downstream policy information at a first network node supporting throughput of network traffic. The upstream routing policy information at the first node is used to identify a second node to forward upstream traffic (e.g., network traffic received from one or multiple sources traveling in a first direction) received from a first client communicating through the first node. The downstream routing policy information at the first node is used to forward downstream network traffic (e.g., network traffic received from one or multiple sources traveling in a second direction but not necessarily in an opposite direction as the upstream traffic) received from another node to the first client. Thus, in general, separate routing policy entries are maintained to support routing and forwarding of traffic depending on their direction. By preventing use of the downstream policy routing information to route upstream network traffic, the first node may forward or route traffic along a path that the network traffic otherwise would have not traveled. Thus, network traffic communicated through the first node can be forced to travel through a network node (e.g., a second node) that it would have not otherwise have traveled if the downstream policy information was used to route the network traffic.

It should be noted that use of the relative terms upstream and downstream merely identify network traffic in different directions. For example, in the context of a service provider network supporting transmission of messages between a client and a service provider network, upstream traffic may be network messages received from a client for transmission to a target device such as a provider edge 'hub' node or customer edge 'hub' node. Downstream traffic may be network traffic received at the first node from a wholesale service provider network (or at least traffic routed through the service provider network).

In further embodiments and yet other independent embodiments of the invention, the first network node may be configured to receive a session initiation request from a client desiring to establish a session to communicate through the first node. The client may not yet be assigned a network address for transmitting and receiving data messages. Upon receipt of the session initiation request, the first node may obtain network address assignment information from a network address server (e.g., a RADIUS server that assigns IP addresses for use by requesting clients) for the first client that generated the session initiation request. The assignment information including network address information may be forwarded to the first node and other network nodes for creating routes. For example, an assigned network address may uniquely identify a client over other nodes in the network.

In addition to notifying the client of its assigned network address information, the first node may populate its downstream routing policy information to include the network address information identifying the requesting client node. Generally, inclusion of the network address information of the client in the downstream routing policy information enables the first node to route information received from other upstream nodes back to the client. In one application, the first node populates the downstream policy information (e.g., VRF information for routing data packets to the clients) with network address information of each new client associated with a given service. Thus, a list of supported clients nodes may be dynamically updated depending on establishment and termination of client network sessions.

Because the upstream and downstream routing policy information vary depending on which direction of traffic they support, they each may include information associated with multiple clients. For example, the downstream routing policy information may be a VRF including a list of multiple clients supported by or coupled to the first node. In contradistinction, conventional methods require tracking separate VRF instances for each of multiple clients. If separate VRF entries are maintained for each of ten thousand clients, it would require management of ten thousand corresponding VRF instances (one for each client). According to an embodiment of the present invention, one VRF for upstream information includes a default address (or aggregate) or target (e.g., a hub) to route the upstream traffic while another VRF for the downstream traffic includes a list of multiple client's network address information. Based on the reduction of the number of separate VRF instances, overhead maintenance of VRFs and use of memory resources to store the VRFs can be reduced.

After the downstream policy information is populated in the first node for a new client, the first node may distribute the network address information populated in the downstream policy information (at the first node) to other nodes via use of a notification message distributed according to a system routing protocol such as BGP (Border Gateway Protocol). For example, the first node may be a first provider edge node of a network to which multiple clients are coupled. The first provider edge node may distribute each new network address associated with corresponding clients to a second node such as a second provider edge node of a core network supporting MPLS. Generally, the network address information sent to the second node (or multiple relevant nodes in a wholesale service provider network) is used to update routing policy information at the second node. The routing policy information at the second node is used in turn to identify a route on which to forward appropriately destined traffic to the clients coupled to the first provider edge node.

As discussed, for traffic received from the clients (such as upstream traffic), the first node utilizes the upstream routing policy information to identify a target node to forward the traffic regardless of a destination address associated with the traffic. More specifically, the first node may receive a network message from a client coupled to communicate through the first node. The first node utilizes the upstream routing policy information in the first node to identify a path or default route on which to forward the network traffic. Even if a destination address of the network traffic is another client coupled to the first node, the first node looks up a target route in the upstream routing policy information to identify a default route or node (such as a provider edge hub node or customer edge hub node) to forward the traffic. This technique of preventing use of the downstream routing policy information at the first node forces the network traffic to travel a path that it otherwise may not have traveled if the downstream routing policy information were available (e.g., in the same VRF table) to route upstream traffic. For example, if a first client coupled to the first node sends a message to a second client coupled to the first node, the first node might route the message received from the first client directly to the second client if the downstream routing policy information were available to route data. According to principles of the present invention, the message is forwarded along a route or target (such as a default route or target) specified by the upstream routing policy information even though a shorter path may exist directly back to the second client.

According to one embodiment, the upstream routing policy information and downstream policy information at the first node enables establishment of a VPN (Virtual Private Network) connection between the first node and the second node (e.g., the default hub node) on which to forward traffic from the first client. Based on routing policy information at the second node, a return path (such as another VPN) may be established between the second node and the first node on which to forward the network messages to the first client through the first node.

Forcing traffic to travel through a node that it otherwise would not have traveled serves a purpose not supported by conventional techniques. For example, a target-specific packet processing technique for monitoring data packet flows may be implemented at the second node (such as a node of an ISP network) to monitor an amount of traffic associated with a particular client. Thus, a service provider may identify how much to charge a client for transmitting data through the network. Additionally, a monitoring authority such as an agency may monitor contents of data packets at the second node to identify whether the network is being used for illicit purposes.

One embodiment of the present invention is directed to a computer program product that includes a computer readable medium having instructions stored thereon for configuring a network node to support routing of network messages. The instructions, when carried out by a processor of the data communication device, cause the processor to perform the steps of: i) maintaining separate upstream routing policy information and downstream policy information at the first node, the upstream routing policy information being used at the first node to identify a second node to forward upstream traffic received from at least a first client communicating through the first node, the downstream routing policy information being used at the first node to forward downstream traffic received from a node to at least the first client; and ii) for traffic transmitted by the first client through the first node, preventing use of the downstream policy routing information to route the traffic and instead utilizing the upstream routing policy information in the first node to ensure forwarding of the traffic transmitted by the first client from the first node to the second node. Other arrangements of embodiments of the invention that are disclosed herein include software programs to perform any of the method embodiment steps and operations summarized above and disclosed in detail below.

The embodiments of the invention may be implemented by computer software and/or hardware mechanisms within any type of computing apparatus. It is to be understood that the embodiments of the invention can be embodied strictly as a software program, as software and hardware, or as hardware and/or circuitry alone such as in a provider edge router in a service provider network. The features of the invention, as explained herein, may be employed in data communications devices, computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One conventional implementation of an MPLS/VPN hub & spoke topology requires separate VRF entries for each of multiple clients communicating through the same PE node in order to force network traffic from the clients to travel through a hub site. Otherwise, if the spokes (for multiple clients) were maintained in the same VRF at the PE node (as is done in conventional systems), the traffic between the spokes could be switched locally and would not travel through a hub site such as an ISP network as discussed above. Such an implementation of tracking individual VRF entries for each client (e.g., spoke) may be acceptable for a small number of spokes, but it is burdensome in conventional designs to maintain, utilize and store individual VRF entries for each of multiple spokes (e.g., many clients) associated with the same PE node.

Because remote access to MPLS/VPN (e.g., terminating xDSL users) networks often requires that all traffic travel through a hub site (such as an ISP network), use of an individual VRF entry for each subscriber as may be done in conventional system designs results in a scalability problem. According to embodiments of the invention, this problem is addressed by supporting spokes to multiple clients by creating, in one embodiment, two VRFs to support users that belong to the same "hub&spoke" group. One of the VRFs (e.g., an upstream VRF) may be used to forward packets received from a client through a core MPLS network (e.g., wholesale provider network) to a hub such as an ISP node. Another separate VRF entry may be used to route packets received from the MPLS core network (e.g., packets transmitted from a hub through the core MPLS network) to corresponding clients. Thus, this technique makes use of different VRFs to forward or route data depending on a direction of the data packets to or from subscribers to the provider edge node. Using embodiments of the invention, it is no longer necessary to maintain a separate VRF (including both upstream and downstream information) for each of multiple subscribers. Consequently, use of separate VRF entries depending on direction (as opposed to one for each client) reduces the number of VRF entries to be maintained at the PE routers and also significantly reduces the complexity of remote accesses.

Accordingly, an embodiment of the invention may include a first PE network node. The first PE network node maintains separate routing policy information to forward network traffic depending on a direction of the network traffic. Upstream routing policy information (e.g., a first VRF) at the first node identifies a hub to forward upstream traffic received from a first client communicating through the first node. Downstream routing policy information (e.g. a second VRF) at the first node identifies how to forward downstream network traffic received from the hub to the first client. By preventing use of the downstream routing policy information by the first client to route upstream network traffic, the first node is able to forward traffic along a path that the network traffic otherwise would have not traveled. For example, network traffic communicated through the first node can be forced to travel through the hub node which it would have not otherwise have passed if the downstream policy information was instead utilized at the first PE node to route the network traffic.

Although the techniques described herein can be used in networking applications such as those supported by RFC 2547 (Request For Comment 2547), and particularly to communication devices such as routers that provide connectivity to many remote devices through a network link, the techniques are also well-suited for other applications as well.

Figure 1:
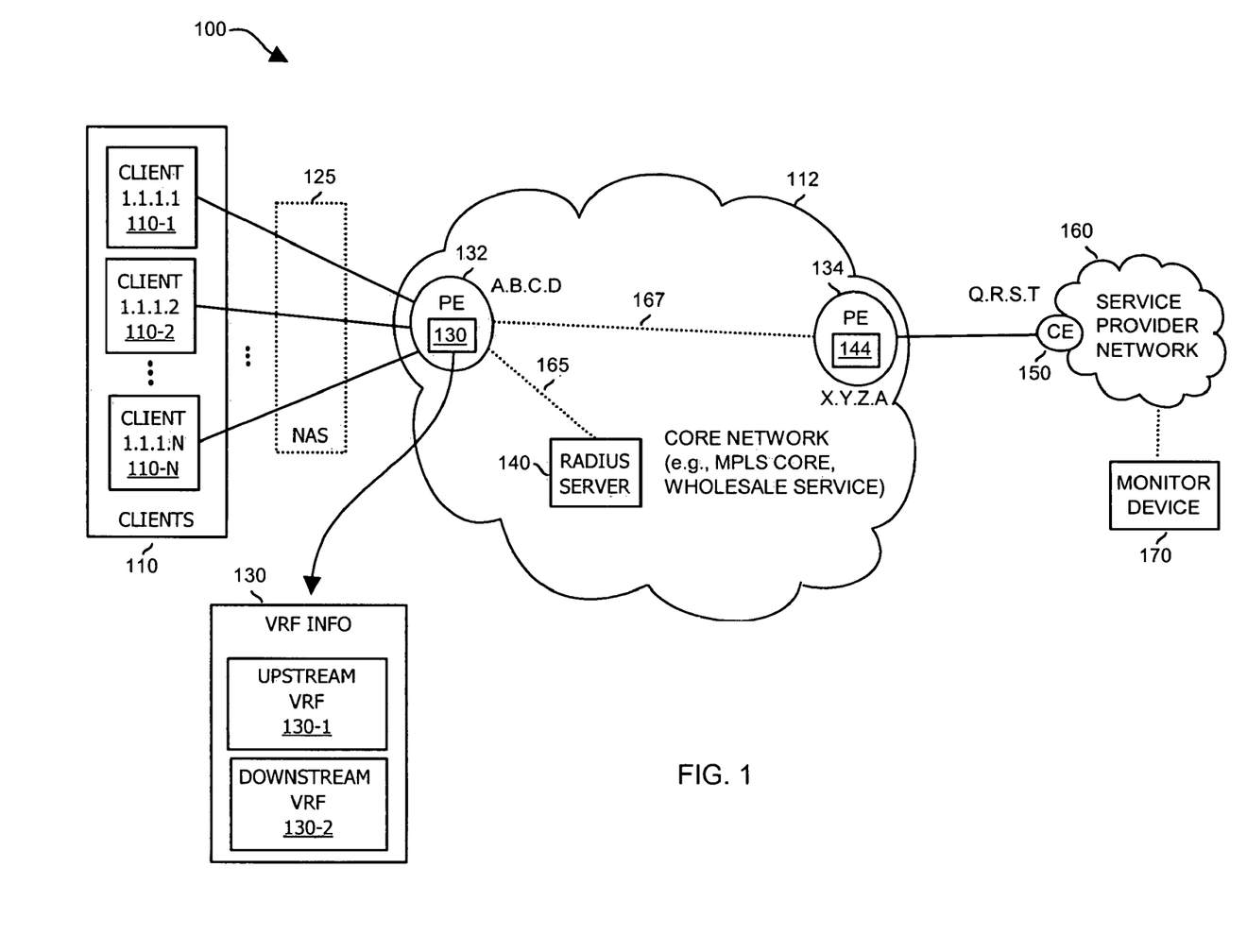
FIG. 1 is a diagram of a communication system to maintain separate routing policy information at edge nodes of a network according to an embodiment of the invention.

FIG. 1 is a diagram of communication system 100 supporting dynamic update of configuration information according to an embodiment of the invention. As shown, communication system 100 includes clients 10-1, 110-2, . . . 110-N, Network Access Server (NAS) 125, core network 112, Radius Server 140, CE (Customer Edge) node 150, service provider network 160, and monitor 170. At its periphery, core network 112 includes PE (Provider Edge) node 132, and hub PE node 134.

In one embodiment, clients 110 dial into network access server 125 to establish network sessions through PE node 132. For example, PE node 132 may receive and forward username and password information provided by a client 110 to radius server 140. After authentication of a user, radius server 140 (potentially in conjunction with other Radius servers devices) generates network address information such as an IP address for use by a client 110. As shown respective clients 110-1, 110-2, . . . 110-N, have been assigned IP network addresses 1.1.1.1, 1.1.1.2, . . . 1.1.1.N. Based on the network addresses, traffic in communication system 100 can be routed to uniquely identified clients 110.

PE node 132 maintains VRF information 130 to support proper routing of network messages such as TCP/IP (Transmission Control Protocol/Internet Protocol) data packets. As shown, VRF information 130 includes upstream VRF information 130-1 and downstream VRF information 130-2. In general, VRF information 130 supports forwarding or routing of traffic based on a direction (or source) of incoming traffic. For example, traffic such as network messages transmitted from clients 110 (subscribers) through PE node 132 are routed or forwarded based on use of upstream VRF information 130-1. Traffic such as network messages transmitted through and received from core network 112 (e.g., an MPLS service provider) are routed or forwarded through PE node 132 to clients 110 based on use of downstream VRF information 130-2.

More specifically, in an upstream direction from a client 110 toward core network 112 such as an MPLS backbone network supporting VPN (Virtual Private Network) connections, PE node 132 intercepts packets and forwards them based on upstream VRF 130-1 associated with the incoming interface (e.g., from clients 110 such as users at corresponding host computers). Upstream VRF 130-1 includes a default route that points toward hub PE node 134, which may be part of a hub and spoke topology. For example, PE node 132 can be considered a spoke while PE node 134 and CE node are associated with a hub. Notably, communication system 100 may include multiple spokes (such as other PE nodes) coupled through core network 112 to hub PE node 134.

The default route in upstream VRF 130-1 may be learned dynamically from hub PE node 134. The default route in VRF 130-1 points to an interface (e.g., CE node 150) that attaches to the upstream ISP (Internet Service Provider) such as service provider network 160. The route may be a non-aggregate route to avoid IP lookups within the PE hub nodes 134 VRF 144.

For network messages in the downstream direction from core network 112 to clients 110, downstream VRF 130-2 includes /32 routes of all subscribers (e.g., clients 110) of the given service for which downstream VRF 130-2 serves. PE node 132 populates downstream VRF 130-2 with routes based on network address information (e.g, IP addresses assigned to clients) provided by radius server 140. Routes from downstream VRF 130-2 are redistributed as normal into MP-BGP (Multi-Protocol Border Gateway Protocol) and are advertised across the core network 112. Such routes are imported into VRF 144 at the hub PE node 134 (e.g., a hub PE-router).

This technique of using (e.g., 'half-duplex') VRF information 130 prevents traffic from being switched locally at PE node 132 without traversing other network nodes. For example, network traffic transmitted by client 110-1 destined for receipt by client 110-2 can be forwarded by PE node 132 based on VRF information 130-1 to hub PE node 134 instead of being locally switched at PE node 132 directly back to client 110-2 according to conventional methods. Consequently, monitor device 170 can monitor contents or an amount of traffic generated by client 110-1 through service provider network 160 to client 110-2.

Each VRF (e.g., upstream VRF 130-1 and downstream VRF 130-2) may be created on the LAC/PE-router in advance of the establishment of a PPPoA or PPPoE client connections. In the upstream VRF 130-1, a route-target import statement may be utilized to import the default route 167 from hub PE node 144. In the downstream VRF 130-2, a route-target export command may be utilized to export all of the /32 virtual-access interface addresses toward the hub PE node 134.

According to an embodiment of the present invention, when a client 110 such as a PPP client dials in through NAS 125, PE node 132 installs the PPP peer route (and per-user static routes if defined on a AAA [Authentication, Authorization and Accounting] server) in the VRF associated with the interface. For example, PE node 132 installs the PPP peer routes in the downstream VRF 130-2 and uses this information to forward packets received from the MPLS core. The VRF associated with the PPP interfaces (e.g., upstream VRF 130-1) includes a default route as mentioned. Note that upstream VRF information 130-1 can include more specifically defined routes to hub PE node 144 (or multiple hub PE nodes).

Figure 2:
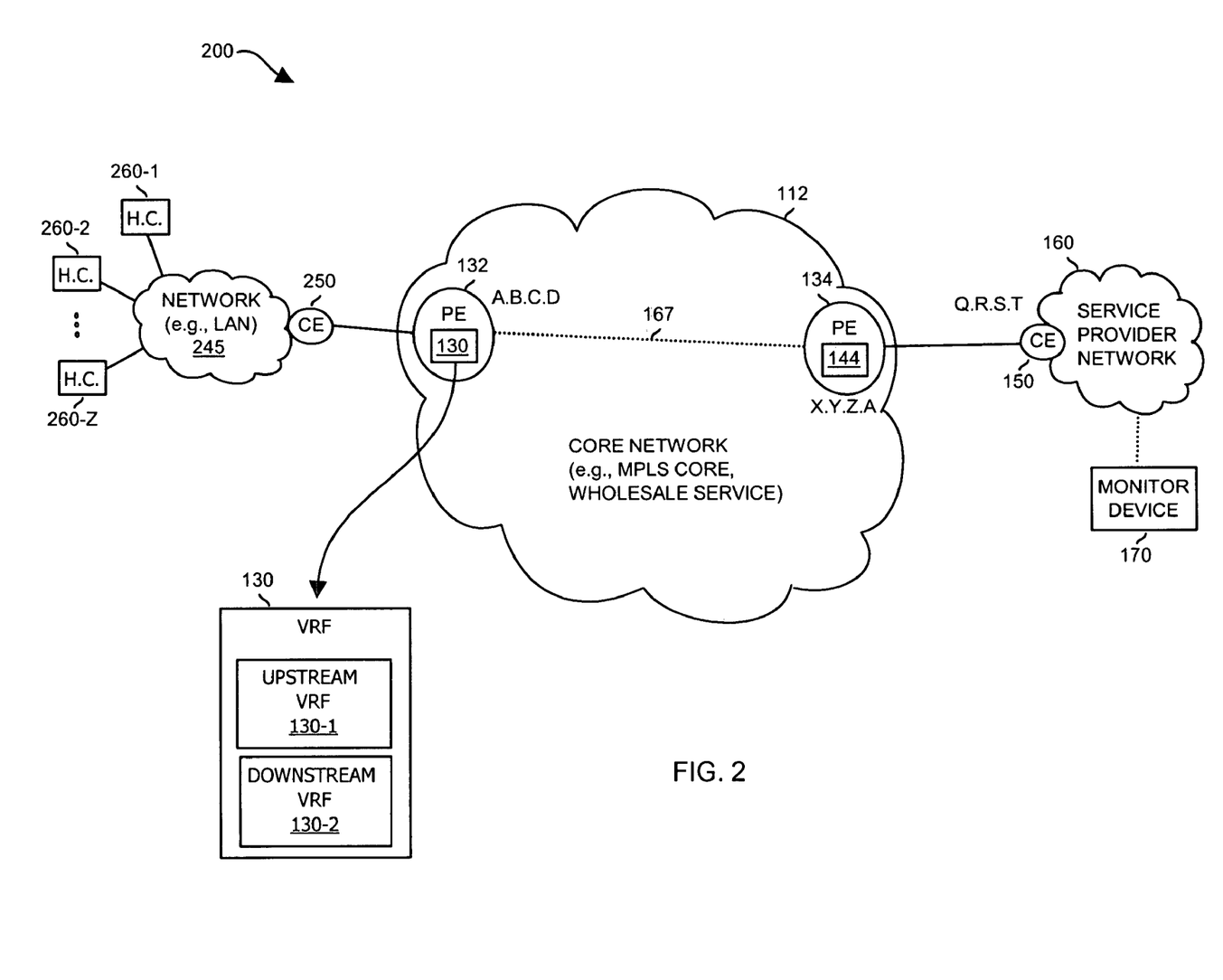
FIG. 2 is a diagram of a communication system to maintain separate routing policy information at edge nodes according to an embodiment of the invention.

FIG. 2 is a block diagram of communication system 200 according to an embodiment of the invention. As shown, communication system is similar to that shown in communication system 100. However, host computers 260 (e.g., clients) coupled to network 245 communicate through CE node 250 and PE node 132 in this hub & spoke topology. Operational aspects of communication system 200 are similar to communication system 100 except that users do not dial in, but instead communicate through network 245 and spoke CE node 250 to PE node 132.

Figure 3:
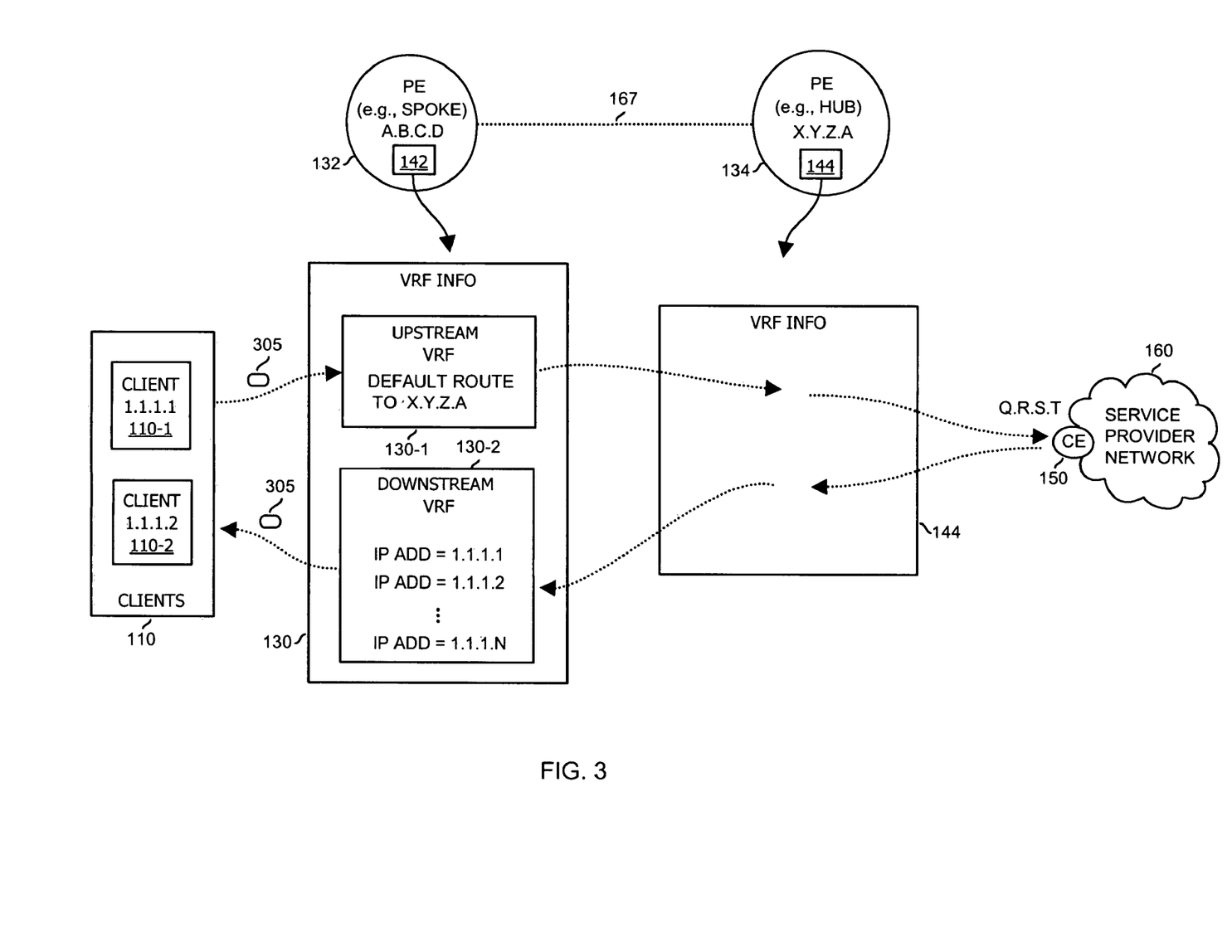
FIG. 3 is a detailed diagram illustrating use of routing policy information and traffic flow according to an embodiment of the invention.

FIG. 3 is a block diagram more particularly illustrating data flow according to an embodiment of the present invention. Generally, PE node 132 forwards data packets 305 based on use of VRF information 130 (e.g., half duplex VRF information) in PE node 132 and VRF information 144 (e.g., conventional VRF information) in PE node 134.

If the hub PE node 134 does not have any spoke CE nodes connected to it (see FIG. 1), then the hub PE node 134 does not need to support half duplex VRFs. For example, hub PE node 134 operates the same way regardless of whether the spoke PE nodes 132 are configured for half duplex VRFs or not.

The hub PE node 134 can be configured using a single VRF (and a single link) for the hub CE node 150. This is a typical configuration for dialup/DSL aggregation. Alternatively, hub PE node 134 may include two separate VRFs supporting two links between the hub PE node 134 and hub CE node 150. This is only needed when the spoke CE node is to be populated with complete routing information. For example, the hub CE node 150 may learn all the spoke routes and readvertise the routes back to the spoke nodes; spoke nodes then see the complete routing information but everything is learned from hub PE node 134). However, in many applications, it is not necessary support this configuration.

As mentioned, VRF 144 can be implemented with a conventional VRF supporting a single hub PE-CE link (e.g., hub PE node 144 need not be configured with half duplex VRFs). For illustrative purposes, let's assume only a single VRF 144 in hub PE node 134 populated with a default route learned from hub CE node 150 (and propagated to spoke PE nodes such as PE node 132 and other nodes if applicable). VRF 144 includes specific routes learned from spoke PE nodes 132 that were advertised to hub CE node 150.

After a client 110 initiates a session, the corresponding spoke PE node (such as PE node 132) installs the associated prefix (e.g., IP address of client) in downstream VRF 130-2 and advertises (e.g., via a BGP message) the prefix to the hub PE node 134. Hub PE node 134 forwards the prefix to hub CE node 150. Consequently, network traffic such as data packet 305 generated by client 110-1 to client 110-2 may be routed based on the following data flows.

For example, client 110-1 generates and transmits message 305 to PE node 132 (i.e., spoke PE node). As discussed, PE node 132 forwards message 305 based on a device from which it is received. Thus, because message 305 is upstream traffic received from client 110, PE node 132 performs an IP lookup and utilizes upstream VRF 130-1 to forward message 305. As mentioned, upstream VRF includes default route 167 (provided by hub PE node 134) pointing to hub PE node 134. PE node 132 forwards message 305 with the appropriate MPLS label stack for transmission through core network 112 to hub PE node 134.

Hub PE node 134 receives packet 305 via MPLS. The top label of packet 305 includes default route 167. Hub PE node 134 removes the MPLS label from packet 305 and forwards the packet 305 to hub CE node 150 based on a corresponding MPLS forwarding code. Thus, an IP lookup is not necessary for the packet 305 on the hub PE node 130.

Hub CE node 150 receives packet 305 from hub PE node 134. In one embodiment, hub CE node 150 may be configured to perform any filtering, accounting, etc. such as routing the packet 305 through a external/internal firewall, ACL filters, etc. Hub CE node 150 forwards the packet 305 to its destination, which could either be local, or learned from the hub PE node 134. In this example, hub CE node 150 forwards the packet 305 back to the hub PE node 134 because the associated destination address is client 110-2.

Hub PE node 134 receives packet 305 (e.g., as an IP packet) from the hub CE node 150 and performs an IP lookup in corresponding VRF 144 to find a route learned from spoke PE node 132. Hub PE node encapsulates packet 305 in MPLS and forwards it to spoke PE node 132 through core network 112.

Spoke PE node 132 receives packet 305 in MPLS and, based on an incoming MPLS label, identifies the prefix (e.g., IP address) in downstream VRF 130-2. After removing the MPLS label, spoke PE node 132 forwards packet 305 towards a destination target (such as client 110-2) of packet 305 based on the MPLS forwarding code. If PE node 132 aggregates the CE addresses, the incoming label of packet 305 identifies an aggregate prefix in downstream VRF 130-2. In this instance, PE node 132 removes the MPLS label and performs an IP lookup in the downstream VRF 130-2 forwarding table.

As previously discussed, use of terms upstream and downstream identify different directional traffic, which are not necessarily opposite of each other. For example, upstream and downstream directional traffic may be orthogonal to each other. Further, it should be noted that upstream VRF 130-1 (e.g., from a spoke PE/CE point of view) may be used to 'forward' packets through PE node 132. In the downstream direction, downstream VRF 130-2 may be more particularly used to 'route' data packets through PE node 132 to a corresponding target client 110. Thus, 'routing' may be based on downstream VRF 130-2 in which the routes learned from the CE are installed, and in which the spoke PE-CE routing protocol operates (including static routing, and connected interface).

Figure 4:
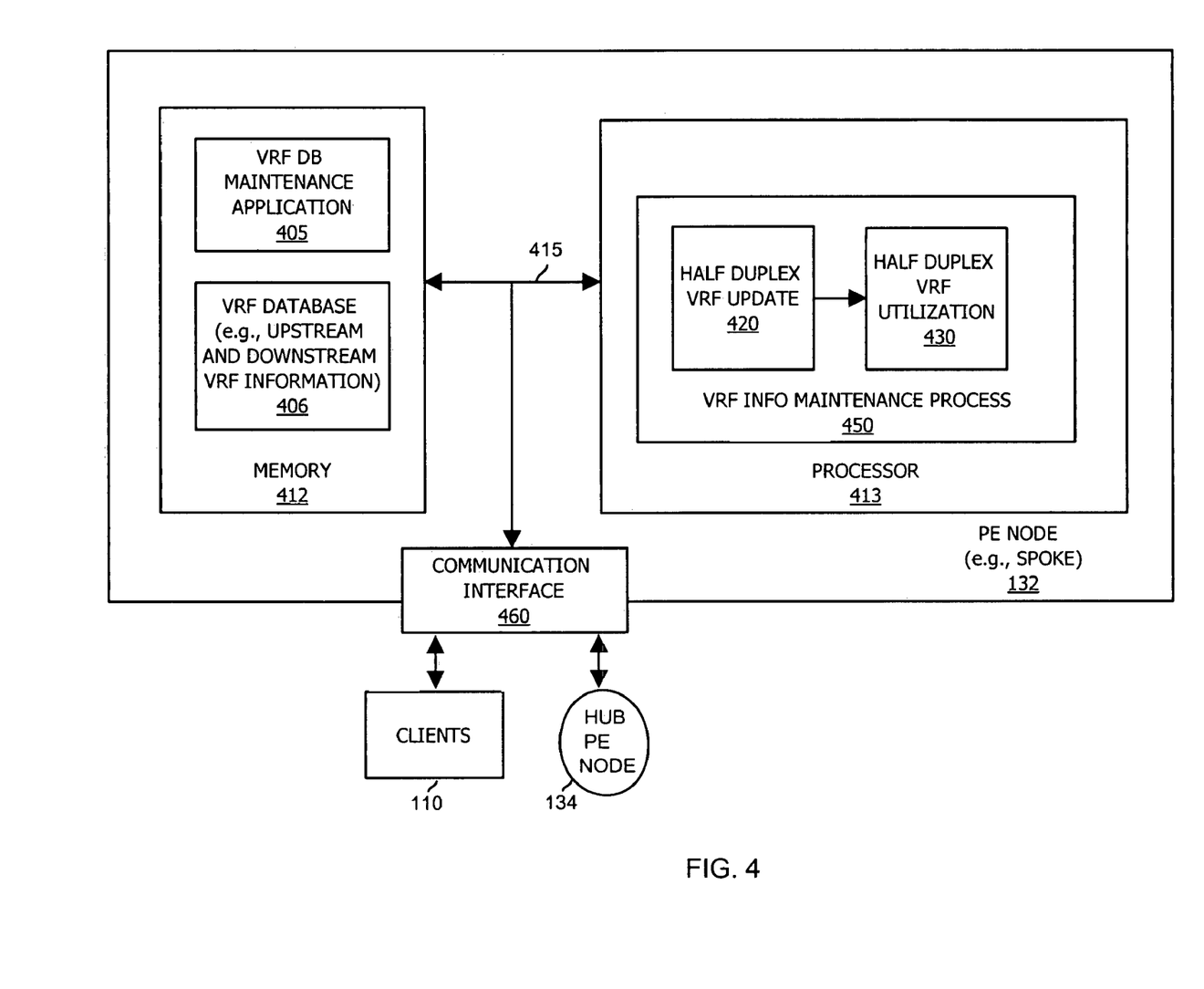
FIG. 4 is a diagram of a computer system and its functional components supporting maintenance and use of routing policy information according to an embodiment of the invention.

FIG. 4 is a block diagram of PE node 132 according to an embodiment of the present invention. As shown, PE node 132 is a computerized device including interconnect 415 such as a data bus or other circuitry interconnecting memory 412, processor 413, and communication interface 460. Processor 413 may be any type of central processing unit, microprocessor, processing device, controller of other electronic circuitry capable of accessing VRF database maintenance application 405 to execute, run, interpret, or otherwise operate VRF database maintenance application 405, to maintain and utilize supporting dynamic updates to VRF information 130 according to embodiments of the invention as explained herein. In other words, VRF database maintenance application 405 may be embodied as a software program that enables PE node 132

(and similar types of nodes) to dynamically update their VRF information 130 based on establishment of sessions with clients 110.

Memory 412 stores VRF maintenance database application 405, and VRF database 406 (e.g., VRF information 130) associated with a corresponding PE node 132. In general, application 405 represents software code, data and/or logic instructions executed by processor 413. When such code is executed, processor 413 creates half duplex VRF update 420 including half duplex VRF utilization 430 processes, which are executed at PE node 132 to update and utilize VRF information 130 to route data as its name suggests. Aspects associated with these processes are more particularly described in connection with FIGS. 5, 6 and 7.

Figure 5:
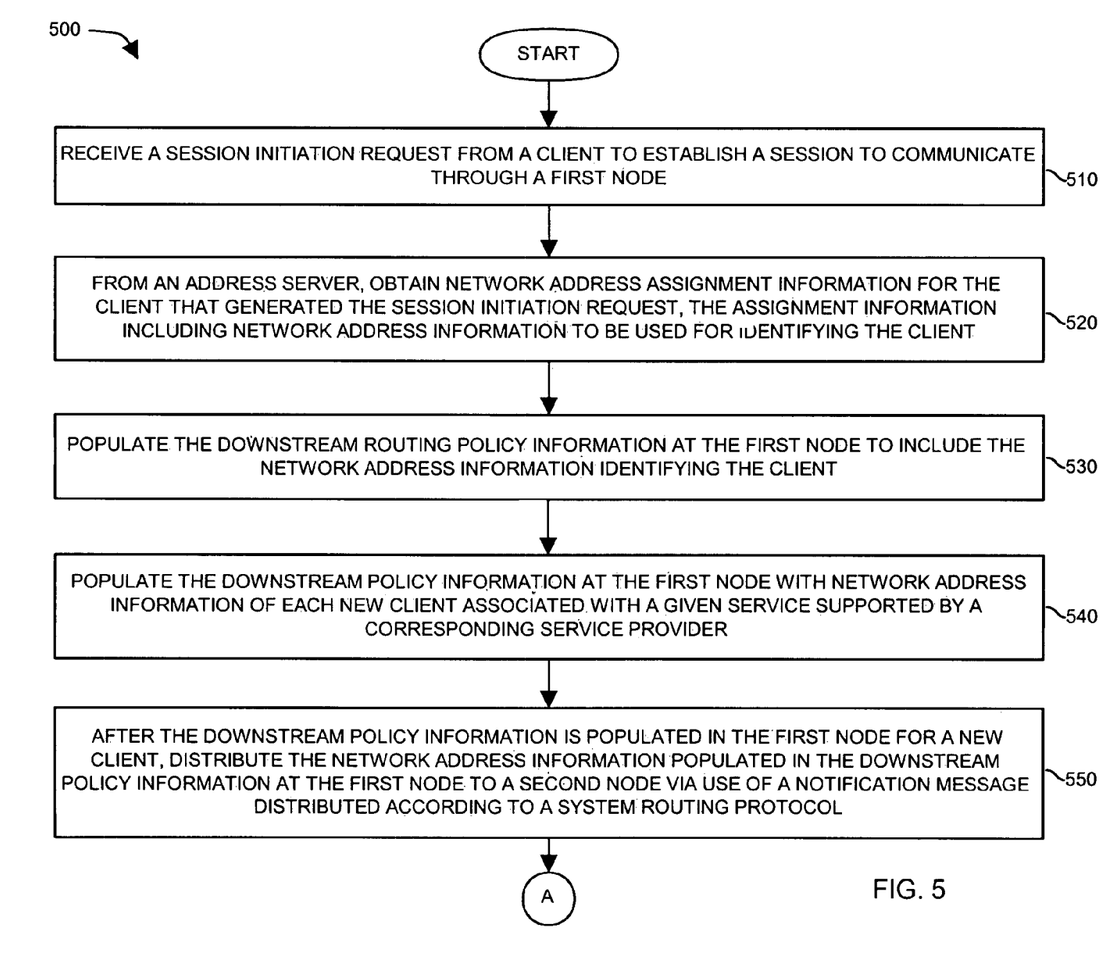
FIGS. 5, 6 and 7 combine to form a flow chart illustrating a technique supporting maintenance and use of routing policy information according to an embodiment of the invention.
Figure 6:
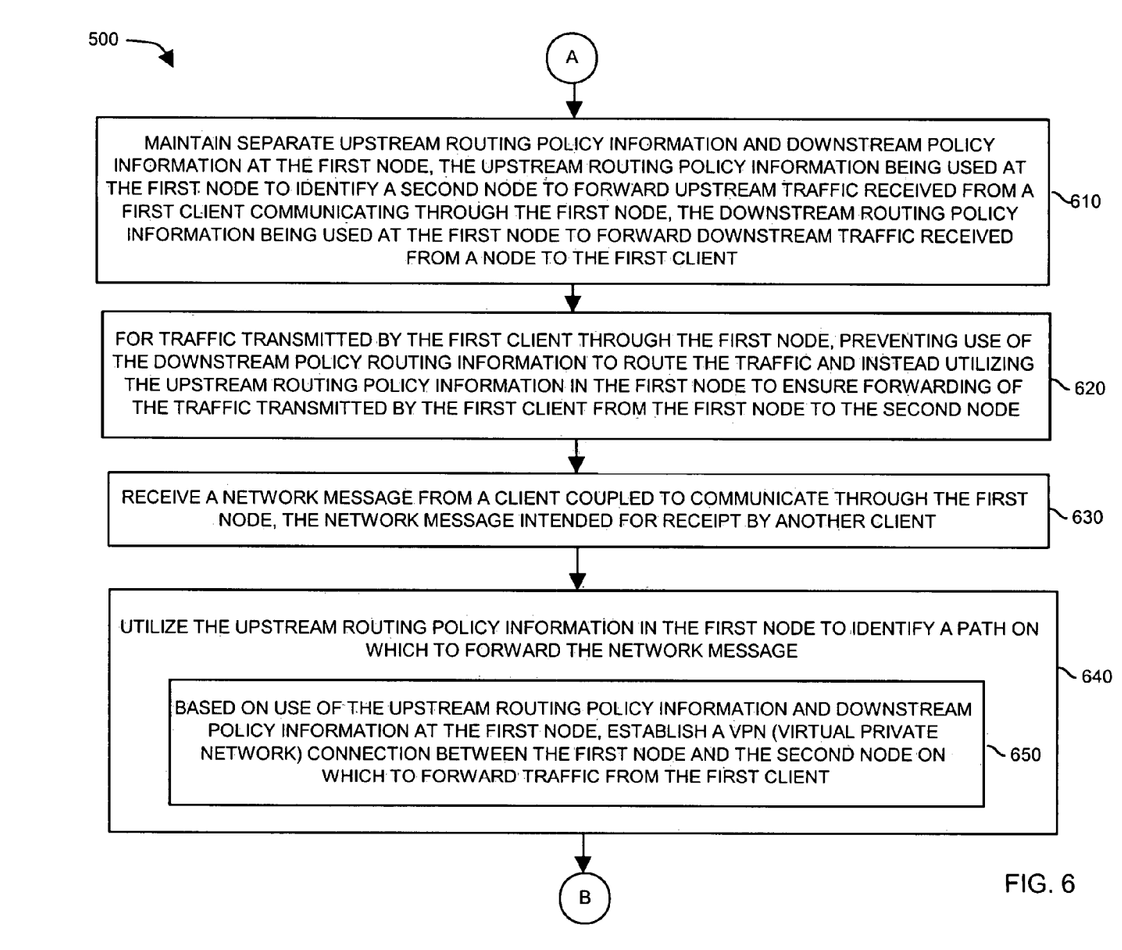
Figure 7:
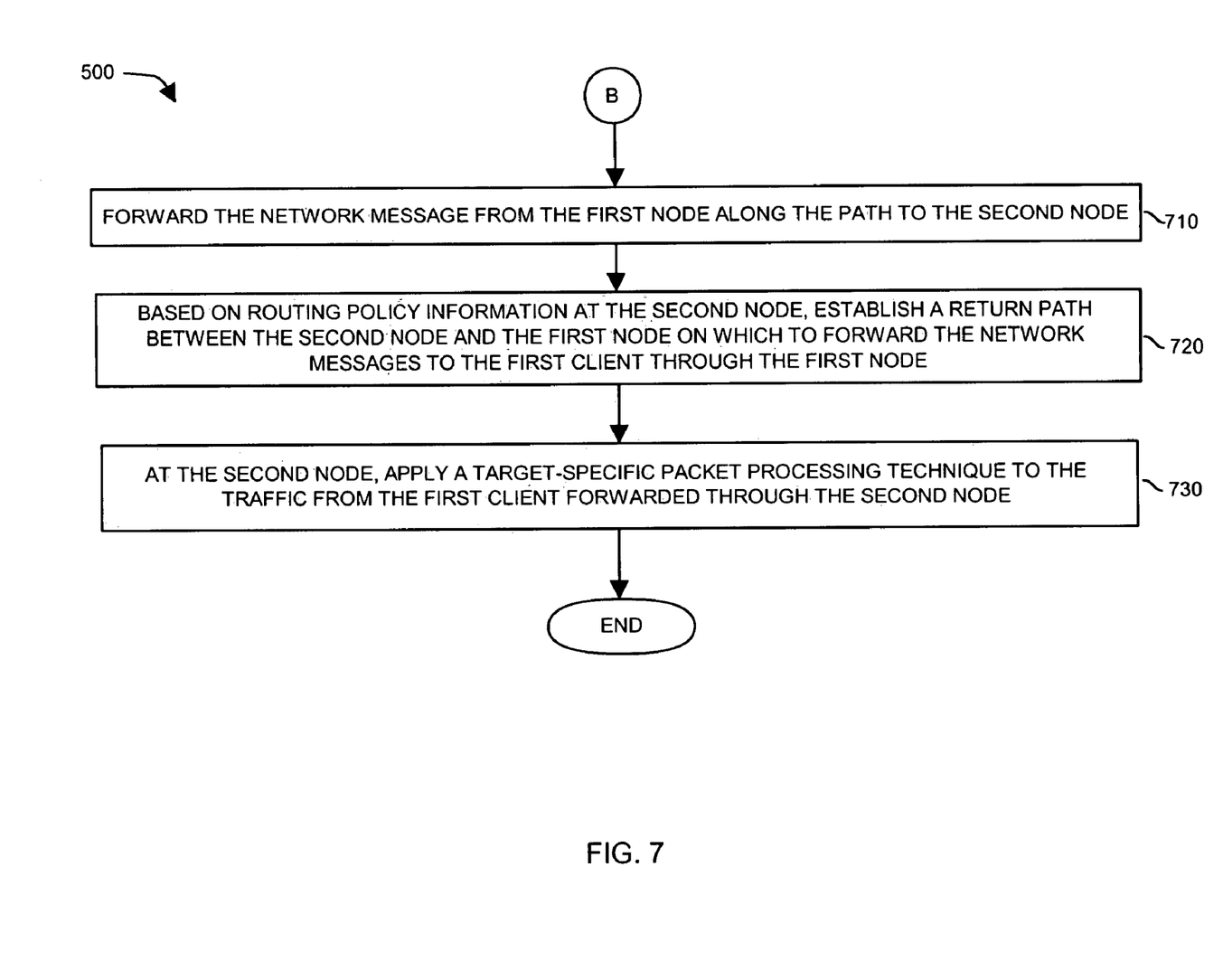

FIGS. 5, 6 and 7 include a diagram of flow chart 500 according to an embodiment of the invention. In general, flow chart 500 illustrates a technique of utilizing and dynamically maintaining VRF information 130 associated with communication systems 100, 200 and, more specifically, PE node 132.

As discussed, PE node 132 may be configured to receive a session initiation request from a client 110 desiring to establish a session to communicate through the PE node 132. The client 110 may not yet be assigned a network address for transmitting and receiving data messages. Upon receipt of a session initiation request in step 510, the PE node 132 obtains (in step 520) network address assignment information from a network address server (e.g., a RADIUS server 140 that assigns IP addresses for use by requesting clients 110) for the first client 110 that generated the session initiation request. The Assignment information (including network address information) is forwarded to other nodes such as hub PE nodes 134 for creating routes between CE node 150 and PE node 132 through core network 112. An assigned network address (such as an IP address) uniquely identifies a client 110 over other nodes in communication system 100.

In addition to notifying the client of its assigned network address information, the first node populates (in step 530) its downstream VRF 130-2 (e.g., downstream routing policy information) to include the network address information identifying the requesting client node 110. Generally, inclusion of the network address information of the client 110 in the downstream VRF 130-2 enables the PE node 132 to route information received from other nodes back to the client 110.

In a similar manner as discussed above for a single client 110, the PE node 132 may populate the downstream policy information (e.g., VRF information for routing data packets to the clients) with network address information of each new client 110 associated with a given service in step 540. Thus, downstream VRF 130-2 can be dynamically created based on establishment of sessions by multiple clients 110. As client sessions are terminated, PE node 132 modifies downstream VRF 130-2 by deleting corresponding network address and corresponding routes. Other node such as PE node 134 may be notified via an appropriate BGP message.

Because the upstream VRF 130-1 and downstream VRF 130-2 store information that is utilized depending on a direction of traffic they support, they each may include information associated with multiple clients 110. For example, downstream VRF 130-2 may include a list of multiple clients 110 (based on IP addresses and associated routes) supported by PE node 132. In contradistinction, conventional methods require tracking separate VRF entries for each of multiple clients. If separate VRF entries are maintained for each client according to conventional methods, it would require management of ten thousand corresponding VRF entries (one for each client) when PE node 132 supports ten thousand clients 110. According to an embodiment of the present invention, one VRF for upstream information (e.g., upstream VRF 130-1) includes a default route (e.g., to a hub) to route the upstream traffic while another VRF for the downstream traffic (e.g., downstream VRF 130-2) includes an entry of each client's network address information and associated routes. Based on this reduction to two VRFs, overhead maintenance of VRFs and use of memory resources to store the VRFs is reduced.

In step 550, after downstream VRF 130-2 is populated in PE node 132 to include information about a new client, PE node 132 distributes the network address information populated in the downstream VRF 130-2 to other nodes via use of a notification message distributed according to a system routing protocol such as BGP (Border Gateway Protocol). For example, PE node 132 may be a first provider edge node of a network to which multiple clients 110 are coupled. The PE node 132 may advertise each new network address associated with clients to other nodes such as a hub PE node 134 of core network 112 supporting MPLS. Generally, the network address information sent to PE node 134 is used to update routing policy information at hub PE node 134.

Referring now to FIG. 6 and step 610, PE node 132 maintains separate upstream VRF 130-1 and downstream VRF 130-2 to support throughput of network traffic. PE node 132 utilizes upstream VRF 130-1 to identify a second node (e.g., PE node 134) to forward upstream traffic (e.g., network traffic received from one or multiple sources traveling in a first direction) received from first client 110-1 communicating through the PE node 132. PE node 132 utilizes downstream VRF 130-2 to forward downstream network traffic (e.g., network traffic received from one or multiple sources traveling in a second direction but not necessarily in an opposite direction as the upstream traffic) received from another node to the first client. Thus, in general, separate routing policy entries are maintained to support routing and forwarding of traffic depending on their direction. By preventing use of downstream VRF 130-2 in step 620 to route upstream network traffic (e.g., network traffic received from clients 110), PE node 132 may forward or route traffic along a path that the network traffic otherwise would have not traveled. Thus, network traffic communicated through the PE node 132 can be forced to travel through a service provider network 160 (e.g., hub CE node 150) that it would have not otherwise have traveled if the downstream VRF 130-2 was instead or also used at PE node 132 to route network traffic.

For traffic received from clients 110 (e.g., upstream traffic) in step 630, PE node 132 utilizes upstream VRF 130-1 in step 640 to identify a target node (e.g. default route) to forward the traffic regardless of an original destination address associated with the traffic. More specifically, PE node 132 may receive a network message from a client 110 coupled to communicate through PE node 132. PE node 132 utilizes the upstream VRF 130-1 to identify a path on which to forward the network traffic. Even if a destination address of the network traffic is another client (coupled to PE node 132), PE node 132 looks up a target route in the upstream routing policy information to identify a default route for the network traffic. This technique of preventing use of downstream VRF 130-2 at PE node 132 forces the network traffic to travel a path that it otherwise may not have traveled if the downstream VRF 130-2 were available to route upstream traffic. For example, if client 110-1 coupled to PE node 132 sends a message to a second client 110-2 coupled to PE node 132, PE node 132 might route the message received from the first client 110-1 directly to the second client 110-2 if downstream VRF 130-2 were available to route upstream directional traffic. According to principles of the present invention, the message is forwarded along a route or target (such as a default route or target) specified by the upstream routing policy information.

In step 650, upstream VRF 130-1 and downstream VRF 130-2 at PE node 132 may enable establishment of a VPN (Virtual Private Network) connection between PE node 132 and hub PE node 134 (e.g., the default hub node) on which to forward traffic from the first clients 110 in step 710 (of FIG. 7). Based on routing policy information at PE node 134, a return path (such as another VPN or the same VPN as discussed above) may be established in step 720 between PE node 134 and PE node 132 on which to forward the network messages to the first client 110 through PE node 132.

Forcing traffic to travel through a node that it otherwise would not have traveled serves a purpose not supported by conventional techniques. For example, in step 730, a target-specific packet processing technique for monitoring data packet flows may be implemented at hub CE node 150 (such as a node associated with an ISP network) to monitor an amount of traffic associated with a particular client 110. Thus, a service provider may identify how much to charge a client for transmitting data through the network. Additionally, a monitoring authority such as an agency may monitor contents of data packets at service provider network 160 to identify whether the network is being used for illicit purposes.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In the network supporting virtual network connections associated with clients communicating through a first node, a method comprising:
   maintaining separate upstream routing policy information and downstream routing policy information at the first node, the upstream routing policy information being configured at the first node to identify a second node to forward upstream traffic received from at least a first client communicating through the first node, the downstream routing policy information being configured at the first node to forward downstream traffic received from the first client; and
   for traffic transmitted by the first client through the first node intended for receipt by a second client downstream of the first node, preventing use of the downstream routing policy information to route the traffic intended for receipt by the second client and instead utilizing the upstream routing policy information in the first node to ensure forwarding of the traffic transmitted by the first client intended for receipt by the second client from the first node to the second node.

2. A method as in claim 1 further comprising:
   receiving a session initiation request from the second client to establish a session to communicate through the first node;
   from an address server, obtaining network address assignment information for the second client that generated the session initiation request, the assignment information including network address information to be used for identifying the second client; and
   populating the downstream routing policy information at the first node to include the network address information identifying the second client.

3. A method as in claim 2 further comprising:
   receiving a network message from the second client coupled to communicate through the first node, the network message intended for receipt by the first client;
   utilizing the upstream routing policy information in the first node to identify a path on which to forward the network message; and
   forwarding the network message from the first node along the path to the second node.

4. A method as in claim 3 further comprising:
   based on routing policy information at the second node, establishing a return path between the second node and the first node on which to forward the network messages to the first client through the first node.

5. A method as in claim 1 further comprising:
   based on use of the upstream routing policy information and downstream policy information at the first node, establishing a VPN (Virtual Private Network) connection between the first node and the second node on which to forward traffic from the first client.

6. A method as in claim 1, wherein the second node is part of a service provider network and the traffic between the first and second node is at least partly supported by a core network supporting a label switching protocol.

7. A method as in claim 1, wherein the upstream routing policy information and downstream policy information at the first node are each half duplex VRFs (Virtual Routing and Forwarding Instances) supporting forwarding of network messages generated by multiple clients communicating with each other through the first node of the second node.

8. A method as in claim 1 further comprising:
   at the second node, applying a target-specific packet processing technique to the traffic from the first client forwarded through the second node.

9. A method as in claim 1 further comprising:
   populating the downstream policy information at the first node with network address information of each new client associated with a given service supported by a corresponding service provider.

10. A method as in claim 9 further comprising:
    after the downstream policy information is populated in the first node for a new client, distributing the network address information populated in the downstream policy information at the first node to the second node via use of a notification message distributed according to a system routing protocol.

11. A method as in claim 10, wherein the system routing protocol is based on BGP (Border Gateway Protocol).

12. A computer system at a first node of a network that at least partially supports a virtual network connection, the computer system comprising:
    a processor;
    a memory unit that stores instructions associated with an application executed by the processor;
    a communication interface that supports communication with other nodes of the physical network; and
    an interconnect coupling the processor, the memory unit, and the communication interface, enabling the computer system to execute the application and perform operations of:
       maintaining separate upstream routing policy information and downstream routing policy information at the first node, the upstream routing policy information being configured at the first node to identify a second node to forward upstream traffic received from at least a first client communicating through the first node, the downstream routing policy information being configured at the first node to forward downstream traffic received from the first client; and for traffic transmitted by the first client through the first node intended for receipt by the second client downstream of the first node, preventing use of the downstream routing policy information to route the traffic intended for receipt by the second client and instead utilizing the upstream routing policy information in the first node to ensure forwarding of the traffic transmitted by the first client intended for receipt by the second client from the first node to the second node.

13. A computer system as in claim 12 that additionally performs operations of:

receiving a session initiation request from the second client to establish a session to communicate through the first node;

from an address server, obtaining network address assignment information for the second client that generated the session initiation request, the assignment information including network address information to be used for identifying the second client; and populating the upstream routing policy information at the first node to include the network address information identifying the second client.

14. A computer system as in claim 12 that additionally performs operations of:

receiving a network message from the second client coupled to communicate through the first node, the network message intended for receipt by the first client;

utilizing the downstream routing policy information in the first node to identify a path on which to forward the network message; and forwarding the network message from the first node along the path to the second node.

15. A computer system as in claim 12 that additionally performs operations of:

based on routing policy information at the second node, establishing a return path between the second node and the first node on which to forward the network messages to the first client through the first node.

16. A computer system as in claim 13 that additionally performs operations of:

based on use of the upstream routing policy information and downstream policy information at the first node, establishing a VPN (Virtual Private Network) connection between the first node and the second node on which to forward traffic from the first client.

17. A computer system as in claim 12, wherein the second node is part of a service provider network and the traffic between the first and second node is at least partly supported by a core network supporting a label switching protocol.

18. A computer system as in claim 12, wherein the upstream routing policy information and downstream policy information at the first node are each half duplex VRFs (Virtual Routing and Forwarding Instances) supporting forwarding of network messages generated by multiple clients communicating with each other through the first node and the second node.

19. A computer system as in claim 12 that additionally performs operations of:

at the second node, applying a target-specific packet processing technique to the traffic from the first client forwarded through the second node.

20. A computer system as in claim 12 that additionally performs operations of:

populating the downstream policy information at the first node with network address information of each new client associated with a given service supported by a corresponding service provider.

21. A computer system as in claim 20 that additional performs operations of:

after the downstream policy information is populated in the first node for a new client, distributing the network address information populated in the downstream policy information at the first node to the second node via use of a notification message distributed according the a system routing protocol.

22. A computer system as in claim 21, wherein the system routing protocol is based on BGP (Border Gateway Protocol).

23. In a network supporting virtual network connections associated with clients communicating through a first node, a method comprising:

maintaining separate upstream routing policy information and downstream policy information at the first node, the upstream routing policy information being associated with a first path for traffic transmitted from a first client to a destination and the upstream routing policy information being used at the first node to identify a second node along the first path to forward upstream traffic received from the first client communicating through the first node, the downstream routing policy information being associated with a second path for traffic transmitted from the first client to the destination different from the first path; and for traffic transmitted by the first client through the first node, preventing use of the downstream policy routing information to route the traffic along the entire second path and instead utilizing the upstream routing policy information in the first node to ensure forwarding of the traffic transmitted by the first client from the first node to the second node.

24. A method as in claim 23, wherein the destination is a second client; and wherein, the traffic transmitted by the first client through the first node intended for receipt by the second client is forwarded to the second node.

25. A method as in claim 23 further comprising:

receiving a session initiation request from a second client to establish a session to communicate through the first node; from an address server, obtaining network address assignment information for the second client that generated the session initiation request, the assignment information including network address information to be used for identifying the second client; and populating the downstream routing policy information at the first node to include the network address information identifying the second client.

26. A method as in claim 25 further comprising:

receiving a network message from the second client coupled to communicate through the first node, the network message intended for receipt by the first client;

utilizing the upstream routing policy information in the first node to identify a third path on which to forward the network message; and forwarding the network message from the first node along the third path to the second node.

* * * * *